(12) United States Patent
Hövel et al.

(10) Patent No.: US 8,610,027 B2
(45) Date of Patent: Dec. 17, 2013

(54) PROCESS FOR PRODUCING A 3-DIMENSIONAL COMPONENT BY SELECTIVE LASER MELTING (SLM)

(75) Inventors: Simone Hövel, Ennetbaden (CH); Alexander Stankowski, Würenlingen (CH); Lukas Rickenbacher, Basel (CH)

(73) Assignee: Alstom Technology Ltd, Baden (CH)

( * ) Notice: Subject to any disclaimer, the term of this patent is extended or adjusted under 35 U.S.C. 154(b) by 412 days.

(21) Appl. No.: 13/009,941

(22) Filed: Jan. 20, 2011

(65) Prior Publication Data

US 2012/0018115 A1   Jan. 26, 2012

Related U.S. Application Data

(60) Provisional application No. 61/298,270, filed on Jan. 26, 2010.

(51) Int. Cl.
*B23K 26/14* (2006.01)
*B22D 27/02* (2006.01)

(52) U.S. Cl.
USPC ..................... 219/121.66; 164/492

(58) Field of Classification Search
USPC ............ 219/121.6–121.66; 264/497; 164/492
See application file for complete search history.

(56) References Cited

U.S. PATENT DOCUMENTS

| 4,927,992 | A | | 5/1990 | Whitlow et al. |
| 5,296,062 | A | | 3/1994 | Bourell et al. |
| 5,730,925 | A | * | 3/1998 | Mattes et al. ................. 264/497 |
| 6,215,093 | B1 | * | 4/2001 | Meiners et al. .......... 219/121.61 |
| 2001/0014403 | A1 | | 8/2001 | Brown et al. |
| 2006/0186101 | A1 | | 8/2006 | Hagemeister et al. |
| 2007/0145629 | A1 | | 6/2007 | Ebert et al. |

FOREIGN PATENT DOCUMENTS

| EP | 0946325 | 10/1999 |
| EP | 1887107 | 2/2008 |
| EP | 2022622 | 2/2009 |
| WO | WO2009/010034 | 1/2009 |

OTHER PUBLICATIONS

Krishna, B. V., et al., "Functionally graded Co—Cr—Mo coating on Ti-6Al-4V alloy structures," Acta Biomaterialia 2008, vol. 4, Nr. 3, pp. 697-706, Elsevier, Amsterdam, NL.
European Search Report for EP Patent App. No. 11150696.0 (Jun. 8, 2011).

* cited by examiner

*Primary Examiner* — Sang Y Paik
(74) *Attorney, Agent, or Firm* — Buchanan Ingersoll & Rooney PC

(57) ABSTRACT

A process produces a 3-dimensional component (16) by selective laser melting (SLM), in which the component (16) is formed on a foundation with a surface, e.g., a platform (10) or a support, which in particular is a component of the same type which has already been produced previously, by successively melting layers of a first metal powder to form a sequence of stacked layers. The process is substantially simplified and made more flexible by virtue of the fact that the separation of the finished component (16) from the surface of the platform (10) or the support thereof is simplified by providing a separating layer (11) between the component (16) and the platform (10) or the support, this separating layer making it possible to separate the finished component (16) from the platform (10) or the support without damaging the finished component (16).

30 Claims, 6 Drawing Sheets

PROCESS FOR PRODUCING A 3-DIMENSIONAL COMPONENT BY SELECTIVE LASER MELTING (SLM)

This application claims priority under 35 U.S.C. §119 to U.S. Provisional Application No. 61/298,270, filed 26 Jan. 2010, the entirety of which is incorporated by reference herein.

BACKGROUND

1. Field of Endeavor

The present invention deals with the field of shaping processes. It relates to a process for producing a 3-dimensional component by selective laser melting (SLM).

2. Brief Description of the Related Art

EP 946 325 B1 discloses a process for producing a shaped body, in which the shaped body is produced by depositing layers of a metallic material in powder form, wherein the material powder is heated to melting temperature by a laser beam which is guided in a plurality of tracks over the predefined region of the layer of material powder (SLM process). The shaped body is produced on a lifting table. A problem with this process is the subsequent separation of the finished shaped body from the building platform of the lifting table.

On the other hand, such an ability to be separated is not necessary if the shaped body is applied directly to another body (see for example U.S. Patent Application Publication No. 2001/0014403 A1).

In laser sintering (see for example U.S. Patent Application Publication No. 2006/0186101 A1), which differs from the SLM process, it has been proposed to form a predetermined breaking point between the shaped body and the support for the separation of the finished shaped body from the support, at which predetermined breaking point the finished shaped body can be broken. Such an ability to be separated is firstly poorly manageable and secondly is associated with irregularities which remain on the shaped body, which necessitate complex remachining.

SUMMARY

One of numerous aspects of the present invention includes a process of the aforementioned type, which can avoid the disadvantages of known processes and is distinguished, in particular, by the fact that the component and underlying surface, e.g., of a support or platform, can be separated in a simple manner without tools.

Another aspect of the present invention includes a process in which the component is formed on a surface by successively melting layers of metal powder to form a sequence of stacked layers. The process is distinguished by the fact that the separation of the finished component from the surface thereof is simplified by providing a separating layer between the component and the surface, this separating layer making it possible to separate the finished component from the surface without damaging the finished component. In this case, a component of the same type, including a separating layer, which has already been produced previously can serve in particular as a foundation including the surface. After the component or the components has or have been finished, the separating layer is removed entirely by virtue of the fact that its strength is reduced (e.g. by melting) such that the components can be removed from the surface without the aid of tools. Complex machining processes for the separation, which impair the components, are thereby dispensed with. In particular, it is possible to produce a plurality of components one above another separated by separating layers and to separate them from one another or from the surface in a single separating operation.

According to one refinement, the separating layer is formed of a meltable material having a melting point which is lower than the melting point of the first metal powder used to form the component.

The separating layer is preferably formed from a second metal powder, which is melted in layers, in particular by laser radiation.

In this case, the separating layer may be in the form of a homogeneous layer.

However, the separating layer may also be in the form of a multilayer layer arrangement.

Another refinement of a process according to principles of the present invention includes that the separating layer is formed from a solder, in particular a solder alloy based on a metal from the group consisting of Al, Ag, Cu, Sn, Cd, Zn, Pb, In, Ga, Bi and Sb.

A further refinement includes that the meltable material of the separating layer has a melting temperature of above 100° C.

The meltable material of the separating layer preferably has a melting temperature of above 300° C.

According to another refinement of the process, the melting point of the first metal powder used to form the component is above 700° C.

In particular, the melting point of the first metal powder used to form the component is between 700° C. and 1700° C.

A further refinement of a process according to principles of the present invention includes that the first metal powder used is a powder from the group consisting of a nickel-based alloy, cobalt-based alloy, titanium-based alloy, and iron-based alloy.

According to another refinement, the finished component is separated from the surface by melting the associated separating layer without further machining.

In particular, the separating layer is melted by local heating in the region of the separating layer.

In this case, the local heating can be affected by inductive heating.

However, the local heating can also be affected by irradiation.

It is likewise conceivable for the local heating to be effected in a heated bath.

Another refinement of a process according to principles of the invention includes that use is made of a separating layer having a thickness of between 30 µm and 300 µm, preferably between 50 µm and 150 µm, in particular between 60 µm and 100 µm.

Furthermore, it may be advantageous if, depending on the application, the component is produced, with respect to the adjoining separating layer, with a more or less large overdimensioning, which includes an interdiffusion zone having a thickness which is determined by the nature of the meltable material of the adjoining separating layer, and if the overdimensioning is removed once the component has been finished and the component has been separated from the surface.

In particular, the thickness of the interdiffusion zone is not more than 500 µm, and is preferably less than 200 µm.

However, the separating layer may also be formed from a metal foil.

In particular, the metal foil can be fixed in the place where it is used by laser radiation.

It is particularly advantageous if the metal foil includes an addition to reduce the melting point, and if the addition is selected such that it does not diffuse into the component, in particular during heating of the separating layer.

Furthermore, it may be advantageous if a molding tool delimiting the edge side is used during the production of the separating layer for separating the various metal powders.

Yet another refinement of a process according to principles of the present invention includes that a plurality of components are produced in succession and one above another in a stack, wherein the previously finished component serves as a foundation for the next component, and in that a separating layer is arranged in each case between adjacent components.

Production is particularly simple if the plurality of components are identical to one another, and if adjacent components in relation to the separating layer are in each case arranged in mirror-image form with respect to one another, such that they abut against one another with identical surfaces.

BRIEF DESCRIPTION OF THE DRAWINGS

The invention will be explained in more detail below with reference to exemplary embodiments in connection with the drawing. FIG. 1 shows the empty platform, FIGS. 2 and 3 show the application of a first separating layer to the platform, FIGS. 4 and 5 show the production of a first component on the first separating layer, FIG. 6 shows the application of a second separating layer to the first component, FIG. 7 shows the production of a second component aligned in mirror-image form on the second separating layer, FIG. 8 shows various modes of separation by melting the separating layers, and FIG. 9 shows the final separation of the components without tools.

DETAILED DESCRIPTION OF EXEMPLARY EMBODIMENTS

FIGS. 1 to 9 show various steps for the production of components according to an exemplary embodiment of the invention. Here, the components to be produced are shown as simple bodies of a frustoconical or truncated pyramid-like shape. It is self-evident that it is possible for the components to have complicated, even polycoherent structures, provided that this can be combined with the selective laser melting (SLM) process.

Figure 1:
FIGS. 1 to 9 show various steps for the production of components according to an exemplary embodiment of the invention, where

According to FIG. 1, the process shown proceeds from a foundation, e.g., a platform 10 arranged in a manner known per se such that it can be moved vertically in a powder bath (not shown), such that layers of powder having a predetermined thickness can be provided in succession on the surface thereof (see e.g. EP 946 325).

Figure 2:
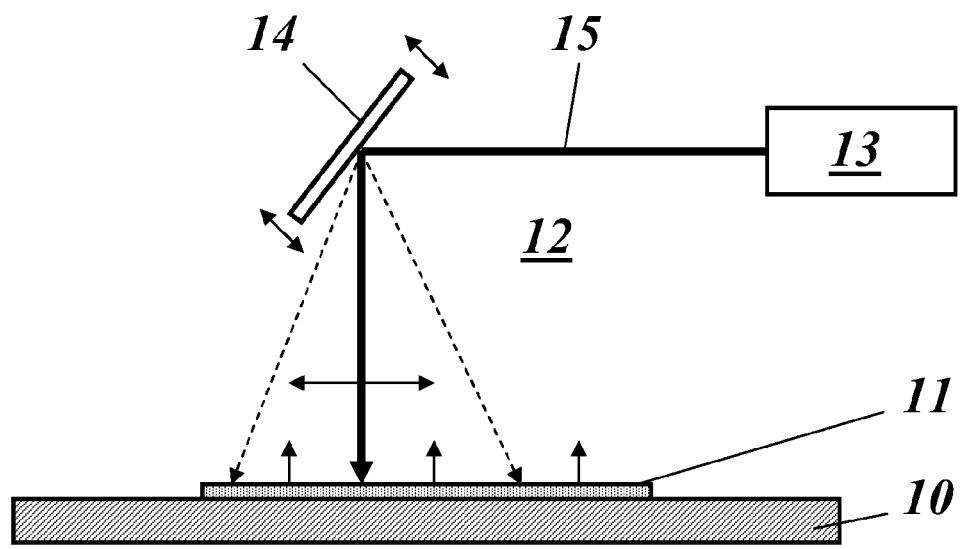
Figure 3:
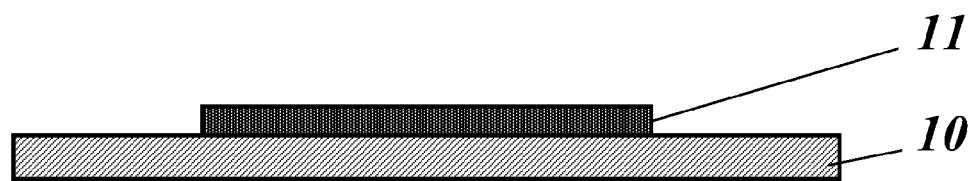

A unique feature of the process described here is that, according to FIG. 2 and FIG. 3, a separating layer 11 is initially applied to the surface of the platform 10, which separating layer should make possible and in particular simplify the subsequent separation of the component made of a first metal powder to be produced from the platform 10. The separating layer 11 can be produced by one or more layers of a special metal foil, the melting point of which is considerably lower than the melting point of the component to be produced, such that the foil can be melted by a concerted heating process without impairing the strength of the component. In the example shown in FIG. 2 and FIG. 3, however, the separating layer 11 is alternatively produced by melting one or more layers of a second metal powder, the melting point of which is considerably lower than the melting point of the first metal powder for the component to be produced.

The second metal powder for the separating layer 11 is melted using a laser apparatus 12, in which a laser 13 sends a laser beam 15 via a pivotable deflecting mirror 14 onto the layer of powder to be melted on the platform 10, this laser beam then moving over the surface in a line-like scanning movement by virtue of an appropriately controlled pivoting movement of the deflecting minor 14 and producing a continuous layer of molten second metal powder. For relatively large thicknesses of the separating layer 11, the process is repeated by applying a plurality of layers of powder one above another and melting them in succession. Within the context of the invention, it has proved to be expedient to use separating layers 11 having a thickness of between 30 µm and 300 µm, preferably between 50 µm and 150 µm, in particular between 60 µm and 100 µm, in order to make reliable separation of the components possible with the smallest possible outlay.

If the melting point of the first metal powder used to form the component is above 700° C., which is preferably the case within the context of the invention, the separating layer 11 is formed from a solder material in powder form, in particular a solder alloy based on a metal from the group consisting of Al, Ag, Cu, Sn, Cd, Zn, Pb, In, Ga, Bi and Sb. Irrespective of whether a metal powder or a foil is used to build up the separating layer 11, the meltable material of the separating layer 11 should have a melting temperature of above 100° C., in particular above 300° C.

Figure 4:
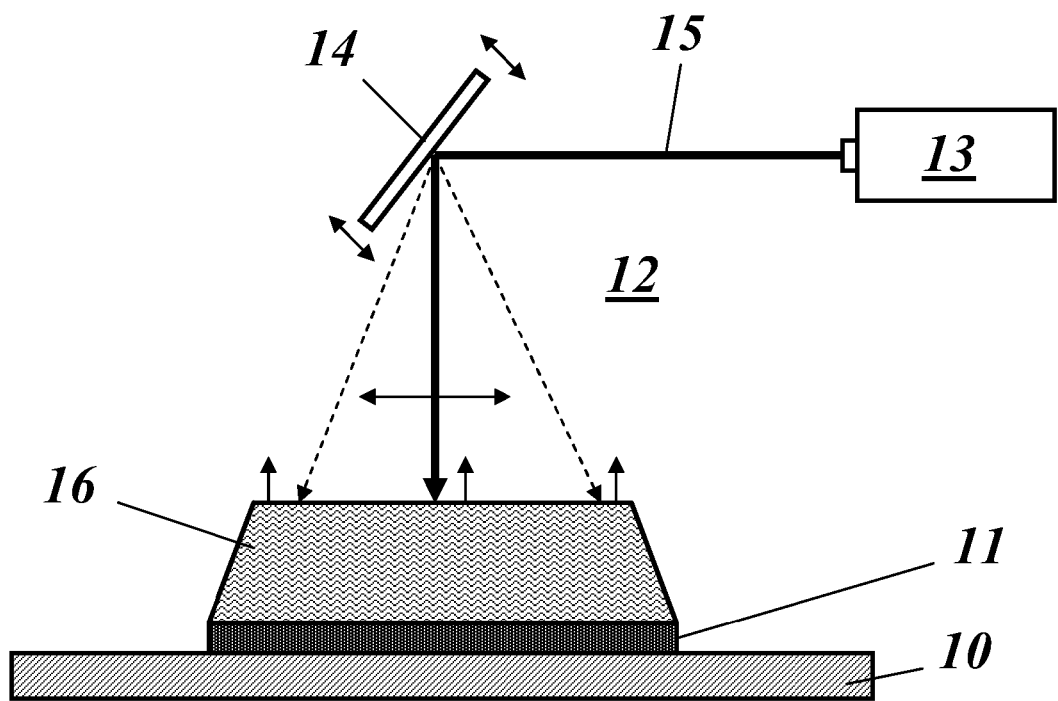
Figure 5:
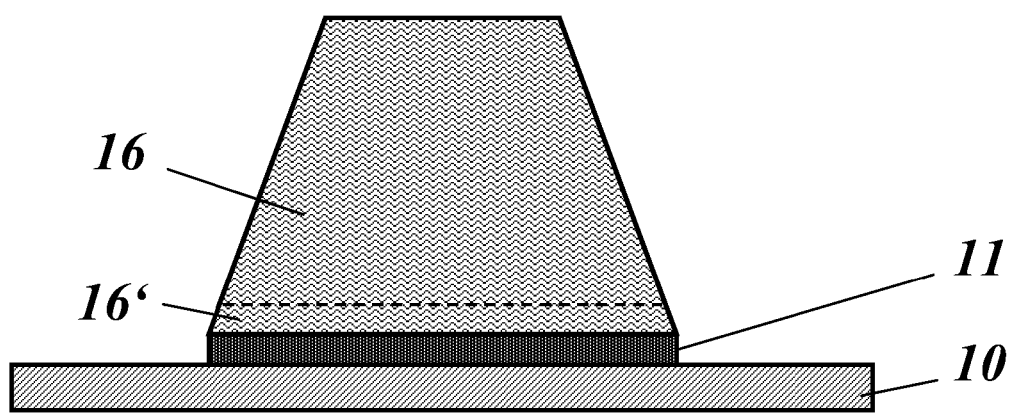
Figure 6:
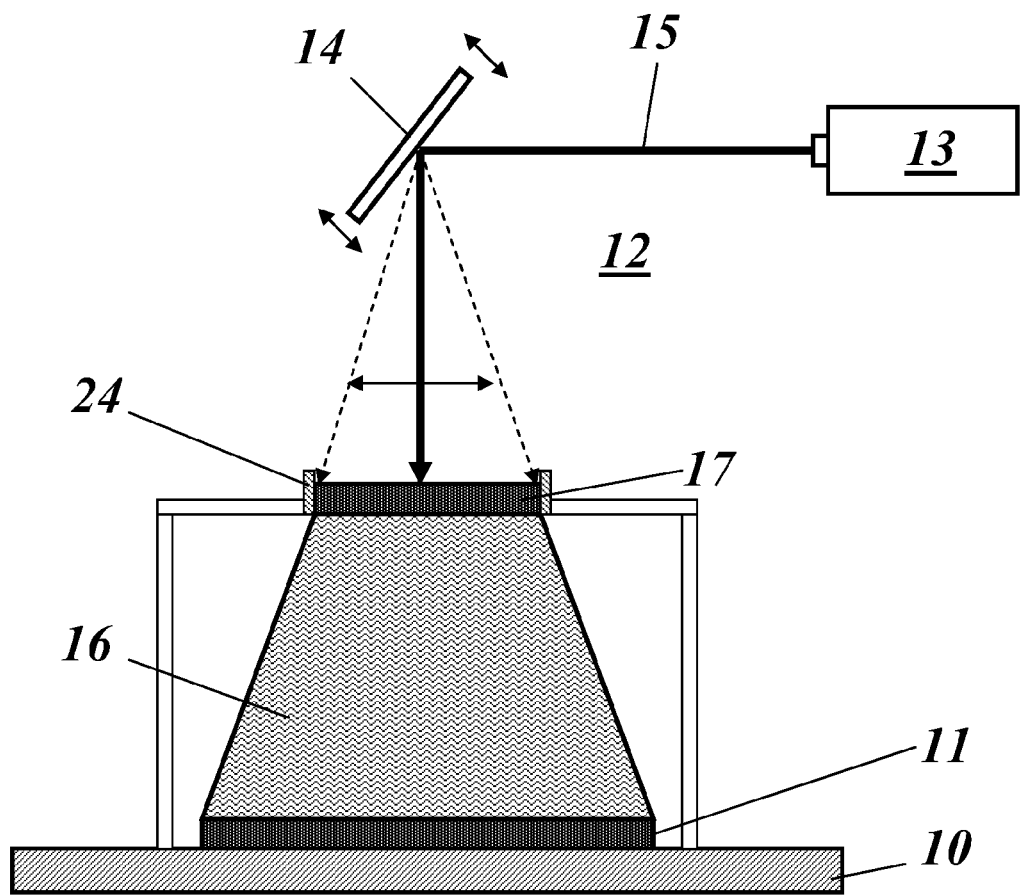

If the separating layer 11 is finished with the desired thickness (FIG. 3), according to FIG. 4 and FIG. 5 a first component 16 can be produced on the separating layer 11. This is done using a first metal powder, the melting point of which is significantly higher than the melting point of the separating layer 11 and—as already mentioned—is above 700° C. The melting point of the first metal powder used to form the component 16 may preferably be between 700° C. and 1700° C. A suitable material in this case is, in particular, a powder from the group consisting of a nickel-based alloy, cobalt-based alloy, titanium-based alloy, and iron-based alloy, e.g., steel.

The component 16 is produced in layers by successively melting thin layers of the first metal powder. For melting, use is made in turn of a laser apparatus 12 of the type described above, the laser beam being controlled in accordance with the individual layers of a CAD model of the component 16 broken down into layers (FIG. 4).

Even if the materials for the component 16 and the separating layer 11 are selected carefully, the elevated temperatures which arise during the production may result in the diffusion of substances from the separating layer into adjoining regions of the component 16, where these substances lead to undesirable effects. In order to reliably preclude such influences, the component 16 may be produced with an overdimensioning with respect to the adjoining separating layer 11, which overdimensioning includes an interdiffusion zone 16' (FIG. 5) having a thickness which is determined by the nature of the meltable material of the adjoining separating layer 11, and which overdimensioning is removed by machining once the component 16 has been finished and the component 16 has been separated from the platform 10 (or a different foundation's surface). It has proved to be beneficial and sufficient in most cases for the thickness of the interdiffusion zone 16' to be not more than 500 µm, preferably less than 200 µm.

Once the (first) component 16 has been finished (FIG. 5), further components can be produced in a particularly simple manner, where the first component 16, which has already been finished, includes the surface and serves as the foundation instead of the platform 10. For this purpose, according to FIG. 6 a second separating layer 17, which is formed of the same material and is produced in the same way as the first separating layer 11, is applied to the free top side surface of the first component 16. As shown in greatly simplified form in FIG. 6, during the production of the second separating layer 17 it is possible to use a molding tool 24, which delimits the edge of the separating layer 17 and at the same time separates the different metal powders for the component 16 and the separating layer 17 from one another.

Figure 7:
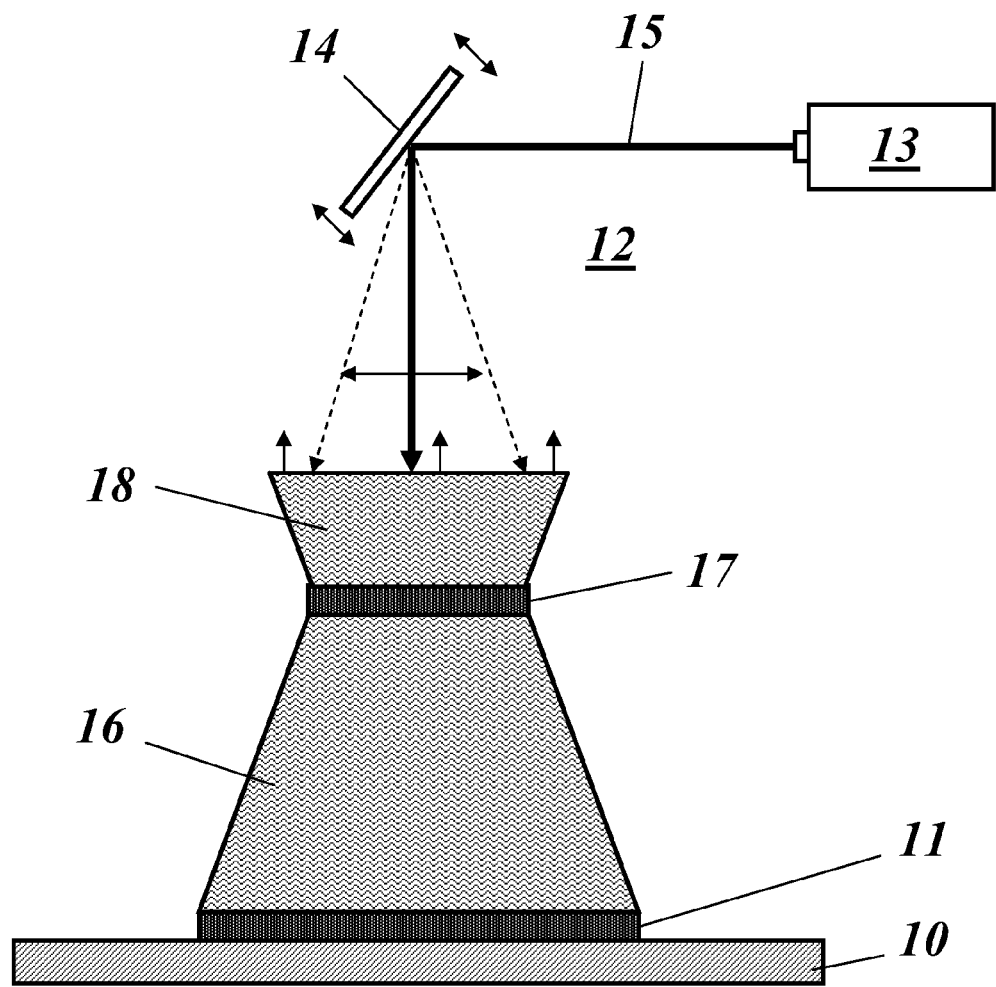

Once the second separating layer 17 has been finished, according to FIG. 7 a second component 18 can be produced on the first component 16 as a support. In this context, use is preferably made of the same first metal powder and the same laser apparatus 12 as for the selective laser melting (SLM) process. This procedure is particularly simple if the components 16 and 18 (and possibly further components 20 according to FIGS. 8 and 9) are identical to one another. If, specifically, adjacent components (16 and 18 or 18 and 20 in relation to the respective separating layer 17 and 19) are in each case arranged in minor-image form with respect to one another, they abut against one another with identical surfaces, such that a single separating layer is adapted in shape and extent to both adjoining components.

Figure 8:
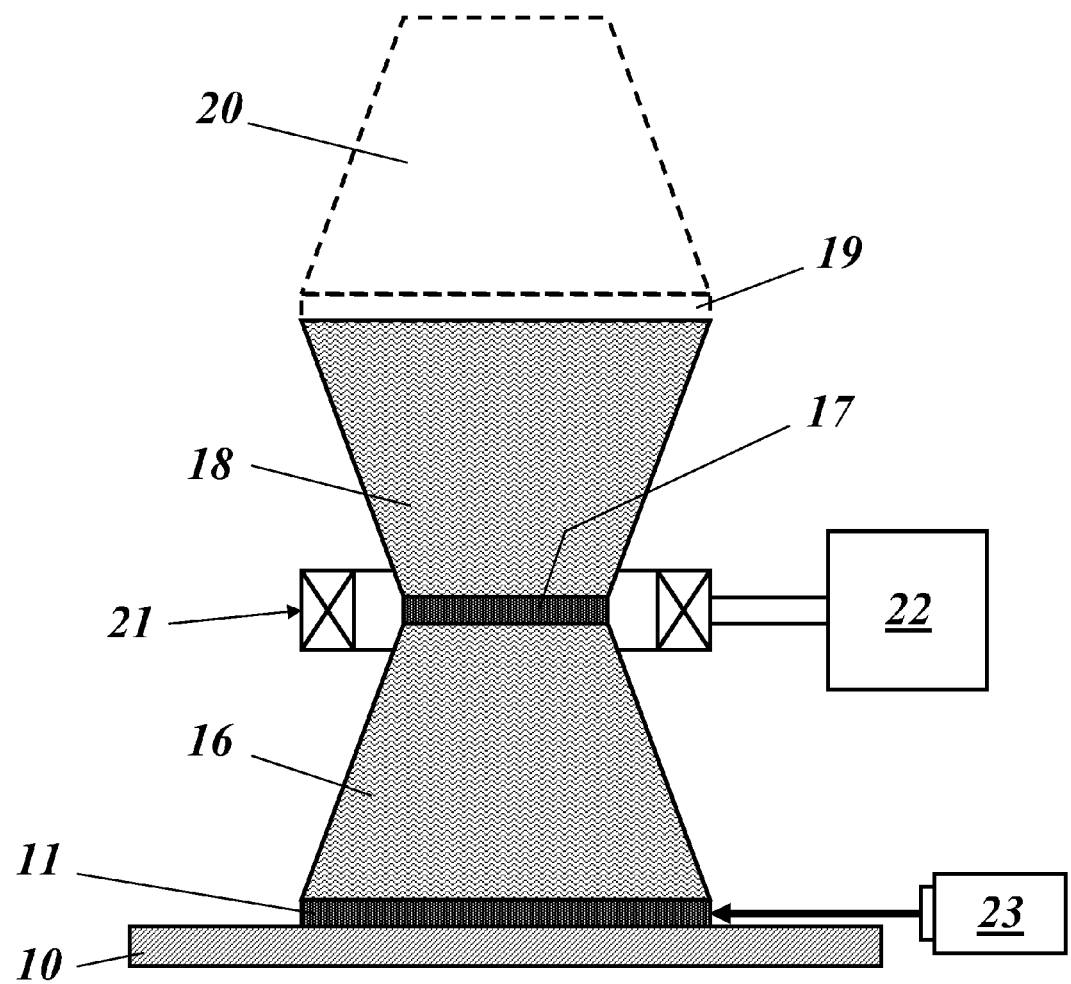

If an individual component 16 or a sequence of a plurality of stacked components 16, 18 and 20 according to FIG. 8 has been finished according to the process described above with the associated separating layers 11, 17 and 19 with the process described above, the components are separated or isolated in a simple manner by removing or melting the associated separating layers 11, 17 and 19 without further machining by using a suitable acid. In particular, the separating layers 11, 17 and 19 are melted by local heating in the region of the separating layers. Such local heating makes it possible to limit the outlay in terms of time and energy and to greatly restrict the diffusion of substances from the separating layers into the adjacent components.

According to FIG. 8, the local heating can be affected by inductive heating of the respective separating layer. In order to melt the separating layer 17, the separating layer may be surrounded by an induction coil 21 supplied with suitable alternating currents by a control unit 22. The currents thereby induced in the separating layer 17 heat up the separating layer until the melting point of the separating layer material is exceeded. Suitable regulation can ensure that the energy fed in is controlled after the melting point is exceeded, in order to reliably preclude any threat to the component. However, it is also conceivable for the local heating to be effected by irradiation. In the example shown in FIG. 8, this is shown on the separating layer 11 by the use of a suitable radiation source 23. However, it is also possible for the local heating to be effected in a heated bath with an inorganic melt (e.g., salt melt) or with organic substances, the boiling point of which is suitably selected.

Figure 9:
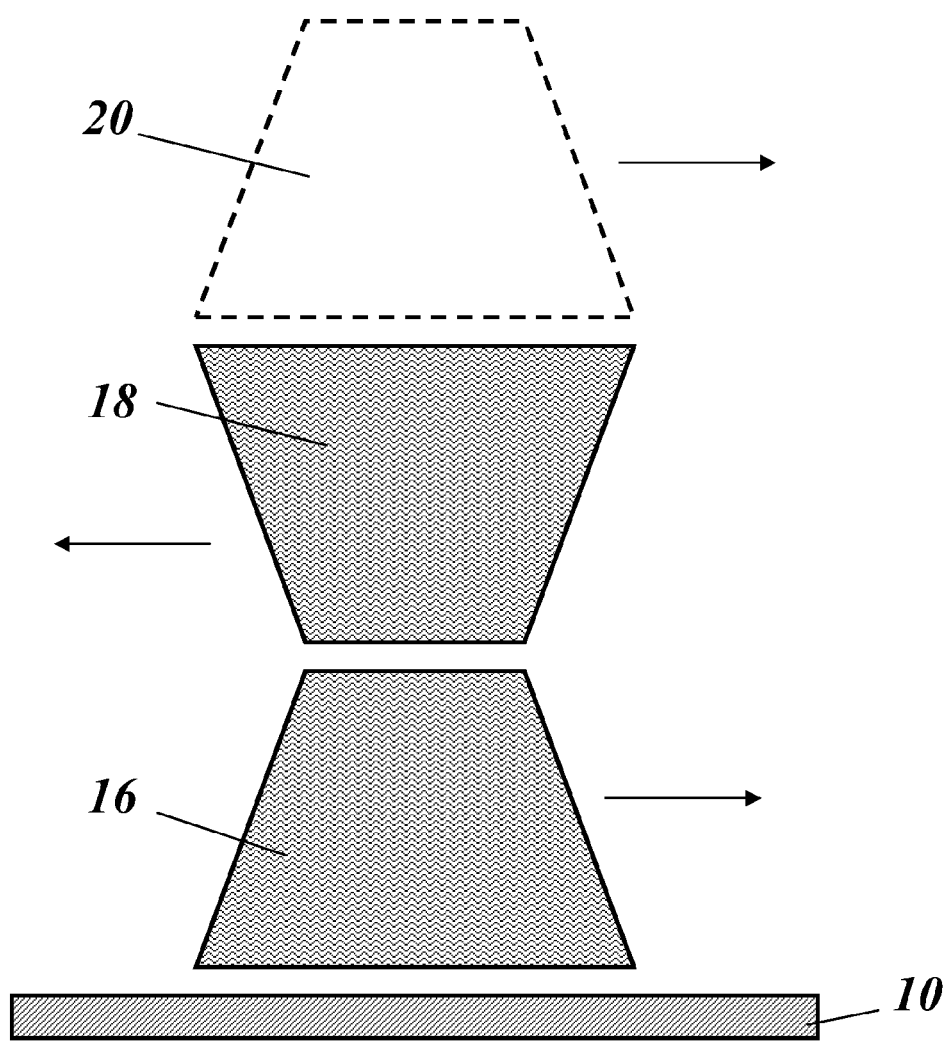

If the separating layers 11, 17 and 19 have been melted in this way, it is possible for the produced components 16, 18 and 20 to be separated easily from the platform 10 or from one another without tools according to FIG. 9.

Processes embodying principles of the present invention can provide the following advantages:

In previous processes, the SLM parts produced on a substrate or a platform or a supporting structure were connected firmly to the corresponding support and had to be removed by an EDM process or the like. Such a complex separating process is superfluous with processes embodying principles of the present invention.

Processes embodying principles of the present invention make it possible to produce a stack of similar components with better utilization of the process space of the installation, which simplifies and accelerates the production and thus leads to more favorable production costs per component.

Within a process embodying principles of the present invention, it is possible to keep the first metal powder and the second metal powder separate from one another, such that mixing is avoided. Expensive excess metal powder can therefore be reused.

Overall, processes embodying principles of the present invention can provide an increase in productivity and flexibility, simplified handling and a reduction in production costs.

List of Reference Symbols
10 Platform
11,17,19 Separating layer
12 Laser apparatus
13 Laser
14 Deflecting minor (pivotable)
15 Laser beam
16,18,20 Component (3D)
16' Interdiffusion zone
21 Induction coil
22 Control unit
23 Radiation source
24 Molding tool While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A process for producing a 3-dimensional component, the process comprising:
   providing a separating layer on a surface;
   forming the component on the surface by successively melting layers of a first metal powder by selective laser melting (SLM) to form a sequence of stacked layers;
   wherein separation of the component from the surface is simplified by the separating layer between the component and the surface, the separating layer being configured and arranged to permit separation of the component from the surface without damaging the component; and
   wherein providing the separating layer comprises providing a layer formed of a meltable material having a melting point which is lower than a melting point of the first metal powder used to form the component.

2. The process as claimed in claim 1, wherein providing the separating layer comprises forming a layer from a second metal powder and said forming comprises melting the second metal powder in layers.

3. The process as claimed in claim 2, wherein melting the second metal powder comprises melting with laser radiation.

4. The process as claimed in claim 2, wherein providing the separating layer comprises providing a homogeneous layer.

5. The process as claimed in claim 2, wherein providing the separating layer comprises providing a multilayer arrangement.

6. The process as claimed in claim 1, wherein providing the separating layer comprises providing a layer formed from a solder.

7. The process as claimed in claim 6, wherein said solder comprises a solder alloy based on a metal selected from the group consisting of Al, Ag, Cu, Sn, Cd, Zn, Pb, In, Ga, Bi, and Sb.

8. The process as claimed in claim 1, wherein the separating layer meltable material has a melting temperature of above 100° C.

9. The process as claimed in claim 1, wherein the separating layer meltable material has a melting temperature of above 300° C.

10. The process as claimed in claim 1, wherein the melting point of the first metal powder is above 700° C.

11. The process as claimed in claim 1, wherein the melting point of the first metal powder is between 700° C. and 1700° C.

12. The process as claimed in claim 1, wherein the first metal powder is a powder selected from the group consisting of a nickel-based alloy, a cobalt-based alloy, a titanium-based alloy, and an iron-based alloy.

13. The process as claimed in claim 1, further comprising:
separating the component from the surface after said forming, including melting the separating layer without machining.

14. The process as claimed in claim 13, wherein melting comprises melting the separating layer by local heating in the region of the separating layer.

15. The process as claimed in claim 14, wherein local heating comprises inductive heating.

16. The process as claimed in claim 14, wherein local heating comprises irradiating.

17. The process as claimed in claim 14, wherein local heating comprises heating in a heated bath.

18. The process as claimed in claim 1, wherein providing a separating layer comprises providing a layer having a thickness between 30 μm and 300 μm.

19. The process as claimed in claim 1, wherein providing a separating layer comprises providing a layer having a thickness between 50 μm and 150 μm.

20. The process as claimed in claim 1, wherein providing a separating layer comprises providing a layer having a thickness between 60 μm and 100 μm.

21. The process as claimed in claim 13, wherein forming the component comprises forming an overdimensioned portion of the component adjacent to the separating layer, the overdimensioned portion comprising an interdiffusion zone having a thickness selected based on the characteristics of the separating layer meltable material, and further comprising:
removing the overdimensioned portion after said separating.

22. The process as claimed in claim 21, wherein forming an overdimensioned portion comprises forming an interdiffusion zone with a thickness not more than 500 μm.

23. The process as claimed in claim 21, wherein forming an overdimensioned portion comprises forming an interdiffusion zone with a thickness less than 200 μm.

24. The process as claimed in claim 1, wherein providing a separating layer comprises providing a metal foil.

25. The process as claimed in claim 24, wherein providing the metal foil comprises fixing in place the metal foil by laser radiation.

26. The process as claimed in claim 24, wherein:
the metal foil comprises an addition to reduce the melting point; and
said addition does not diffuse into the component.

27. The process as claimed in claim 26, wherein said addition does not diffuse into the component during heating of the separating layer.

28. The process as claimed in claim 2, wherein providing the separating layer comprises delimiting an edge side of the separating layer with a molding tool.

29. The process as claimed in claim 1, further comprising:
repeating said providing and said forming, to produce a plurality of components in succession and one above another in a stack, wherein said surface for a new component is a part of a previously formed component, and wherein providing a separating layer comprises providing a layer between adjacent components in said stack.

30. The process as claimed in claim 29, wherein:
the plurality of components are identical to one another; and
adjacent components relative to a single separating layer are each arranged in mirror-image form with respect to one another, such that they abut against the same separating layer with identical surfaces.

* * * * *